(12) United States Patent
Kato et al.

(10) Patent No.: US 8,081,365 B2
(45) Date of Patent: Dec. 20, 2011

(54) OPTICAL SCANNER AND IMAGE-FORMING DEVICE

(75) Inventors: Ryota Kato, Nagoya (JP); Shogo Mori, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/477,423

(22) Filed: Jun. 30, 2006

(65) Prior Publication Data

US 2007/0002415 A1    Jan. 4, 2007

(30) Foreign Application Priority Data

Jun. 30, 2005 (JP) ............... P2005-192049
Jun. 30, 2005 (JP) ............... P2005-192050

(51) Int. Cl.
*G02B 26/08* (2006.01)
*G02B 26/10* (2006.01)
*G02B 26/12* (2006.01)
*B41J 27/00* (2006.01)
*B41J 2/435* (2006.01)

(52) U.S. Cl. ............. 359/216.1; 359/219.2; 347/257; 347/260; 347/263

(58) Field of Classification Search ..... 359/216.1–219.2
See application file for complete search history.

(56) References Cited

U.S. PATENT DOCUMENTS

| 4,809,042 | A | 2/1989 | Homma |
| 5,157,536 | A * | 10/1992 | Uematsu ............... 359/217 |
| 5,247,316 | A | 9/1993 | Komori et al. |
| 5,510,826 | A | 4/1996 | Koide |
| 6,339,491 | B1 | 1/2002 | Kondou et al. |
| 6,750,997 | B2 | 6/2004 | Tamaru et al. |
| 6,775,042 | B2 | 8/2004 | Ishihara |
| 6,864,906 | B2 * | 3/2005 | Yokoyama ............... 347/119 |
| 6,965,466 | B2 | 11/2005 | Ishihara |
| 2003/0103254 | A1 | 6/2003 | Tamaru et al. |
| 2004/0041992 | A1 | 3/2004 | Yokoyama |
| 2005/0062836 | A1 * | 3/2005 | Nakajima ............... 347/225 |

FOREIGN PATENT DOCUMENTS

| JP | 63-6515 A | 1/1988 |
| JP | 1-277259 | 11/1989 |
| JP | 4-369612 A | 12/1992 |
| JP | 6-43372 A | 2/1994 |
| JP | 7-120694 A | 5/1995 |
| JP | 11-295634 A | 10/1999 |

(Continued)

OTHER PUBLICATIONS

"main." The Free Merriam-Webster Dictionary, http://www.merriam-webster.com/dictionary/main?show=1&t=1288707459, Nov. 2, 2010.*

(Continued)

*Primary Examiner* — Stephone B Allen
*Assistant Examiner* — Jade R Chwasz
(74) *Attorney, Agent, or Firm* — McDermott Will & Emery LLP

(57) ABSTRACT

An scanning unit scanner includes a light source and a polygon mirror unit. A front-to-rear rib is disposed between the light source and the polygon mirror unit and near the polygon mirror unit. An input side opening having a slit shape is formed as a cutout in the top edge of the front-to-rear rib. When laser light from the light source passes through the input side opening, the input side opening restricts the width of the light in a main scanning direction.

11 Claims, 9 Drawing Sheets

FOREIGN PATENT DOCUMENTS

| | | |
|---|---|---|
| JP | 2000-229459 A | 8/2000 |
| JP | 2000-258712 A | 9/2000 |
| JP | 2000-284201 A | 10/2000 |
| JP | 3137195 B2 | 12/2000 |
| JP | 2001-215434 | 8/2001 |
| JP | 2002-156595 | 5/2002 |
| JP | 2003-005117 | 1/2003 |
| JP | 2003-140073 A | 5/2003 |
| JP | 2003-156701 | 5/2003 |
| JP | 2003-167210 A | 6/2003 |
| JP | 2003-337294 | 11/2003 |
| JP | 2005-62892 A | 3/2005 |
| JP | 2005-091927 | 4/2005 |
| JP | 2005-115260 A | 4/2005 |

OTHER PUBLICATIONS

Japanese Office Action, with English translation, issued in Japanese Patent Application No. 2005-192050, mailed Sep. 28, 2010.

* cited by examiner

OPTICAL SCANNER AND IMAGE-FORMING DEVICE

BACKGROUND OF THE INVENTION

1. Field of the Invention

The present invention relates to an image-forming device, such as a laser printer, and an optical scanner provided in the image-forming device.

2. Description of the Related Art

Conventional image-forming devices, such as laser printers are commonly equipped with an optical scanner functioning to form electrostatic latent images on a photosensitive member based on image data by scanning a laser beam over the surface of the photosensitive member.

One such optical scanner disclosed in Japanese unexamined patent application publication No. 2005-62892 includes a semiconductor laser; a polygon mirror unit having a polygon mirror formed in the shape of a flat polygonal column, each side surface of which is a reflecting surface for reflecting a laser beam, and a polygon motor for driving the polygon mirror to rotate; and an scanning optical system for forming an image on the surface of the photosensitive member with the laser light deflected and scanned by the polygon mirror unit. The semiconductor laser, the polygon motor, and the scanning optical system are supported on a common support frame, while the polygon mirror is supported on a drive shaft of the polygon motor.

In recent years, there has been demand for optical scanners with increased speed and precision To meet such demands, it is necessary to increase the rotational speed of the polygon mirror (polygon motor). However, increasing the rotational speed of the polygon mirror generates greater vibrations in the polygon mirror unit. These vibrations vibrate the scanning optical system supported on the support frame, which produce displacement in the laser beam. This displacement causes irregularities in the scanning position of the laser beam on the surface of the photosensitive member, degrading the quality of the electrostatic latent image formed thereon.

To reduce the vibrations in the scanning optical system generated by the vibrations of the polygon mirror unit, it is conceivable to increase the number of reinforcing ribs used to reinforce the support frame in order to enhance the stiffness of the support frame. However, adding more reinforcing ribs increases the complexity of the support frame structure, leading to increased costs for manufacturing the support frame.

On the other hand, Japanese Patent No. 3,137,195 proposes a technique for preventing stray light from being irradiated onto the surface of the photosensitive member by providing shielding plates between the polygon mirror and the photosensitive member for shielding the laser beam deflected by the polygon mirror at both ends in the main scanning direction.

SUMMARY OF THE INVENTION

It is an object of the present invention to provide an optical scanner capable of reducing vibrations in an scanning optical system due to vibrations of a deflecting unit without increasing the structural complexity of a support frame, and an image-forming device equipped with this optical scanner. It is another object of the present invention to provide an optical scanner and an image-forming device capable of increasing the rotational speed of a deflecting unit while preventing stray light from being incident on a scanning surface or optical sensor.

In order to attain the above and other objects, according to one aspect of the present invention, there is provided an optical scanner including a light source that emits a light, a deflecting unit that deflects and scans the light in a main scanning direction, an scanning optical system that forms an image on a predetermined surface with the light deflected and scanned by the deflecting unit, and a frame formed with an opening, allowing the passage of the light from the scanning optical system to the predetermined surface. The opening extends in the main scanning direction. The deflecting unit is disposed on one side of the opening with respect to a direction orthogonal to a longitudinal direction of the opening. The scanning optical system is disposed on the other side of the opening opposite the deflecting unit.

According to a different aspect of the present invention, there is provided an image-forming device including a photosensitive member having a photosensitive surface, a light source that emits a light, a deflecting unit that deflects and scans the light in a main scanning direction, an scanning optical system that forms an image on the photosensitive surface of the photosensitive drum with the light deflected and scanned by the deflecting unit, and a frame formed with an opening, allowing the passage of the light from the scanning optical system to the photosensitive surface. The opening extends in the main scanning direction. The deflecting unit is disposed on one side of the opening with respect to a direction orthogonal to a longitudinal direction of the opening. the scanning optical system is disposed on the other side of the opening opposite the deflecting unit.

According to a different aspect of the present invention, there is provided an optical scanner including a light source that emits a light, a deflecting unit that deflects and scans the light in a main scanning direction, and a shielding rib disposed near the deflecting unit and between the light source and the deflecting unit. The shielding rib is formed with a first aperture that allows the passage of the light from the light source while restricting the width of the light.

Note that the meaning of "near the deflecting unit" shall be a position along the optical path between the deflecting unit and the shielding rib at which no other member exists. In other words, a position near the deflecting unit is a position at which light incident on the deflecting unit passes through the opening just prior to striking the deflecting unit.

According to a different aspect of the preset invention, there is provided an image-forming device including a light source emitting a light, a deflecting unit that deflects and scans the light in the main scanning direction, and a shielding rib disposed near the deflecting unit between the light source and the deflecting unit. The shielding rib is formed with a first aperture that allows the passage of the light from the light source while restricting the width of the light.

PREFERRED EMBODIMENT OF THE PRESENT INVENTION

Next, laser printers as image-forming devices according to preferred embodiments of the present invention will be described while referring to the accompanying drawings.

First, a laser printer 1 according to a first embodiment of the present invention will be described.

Figure 1:
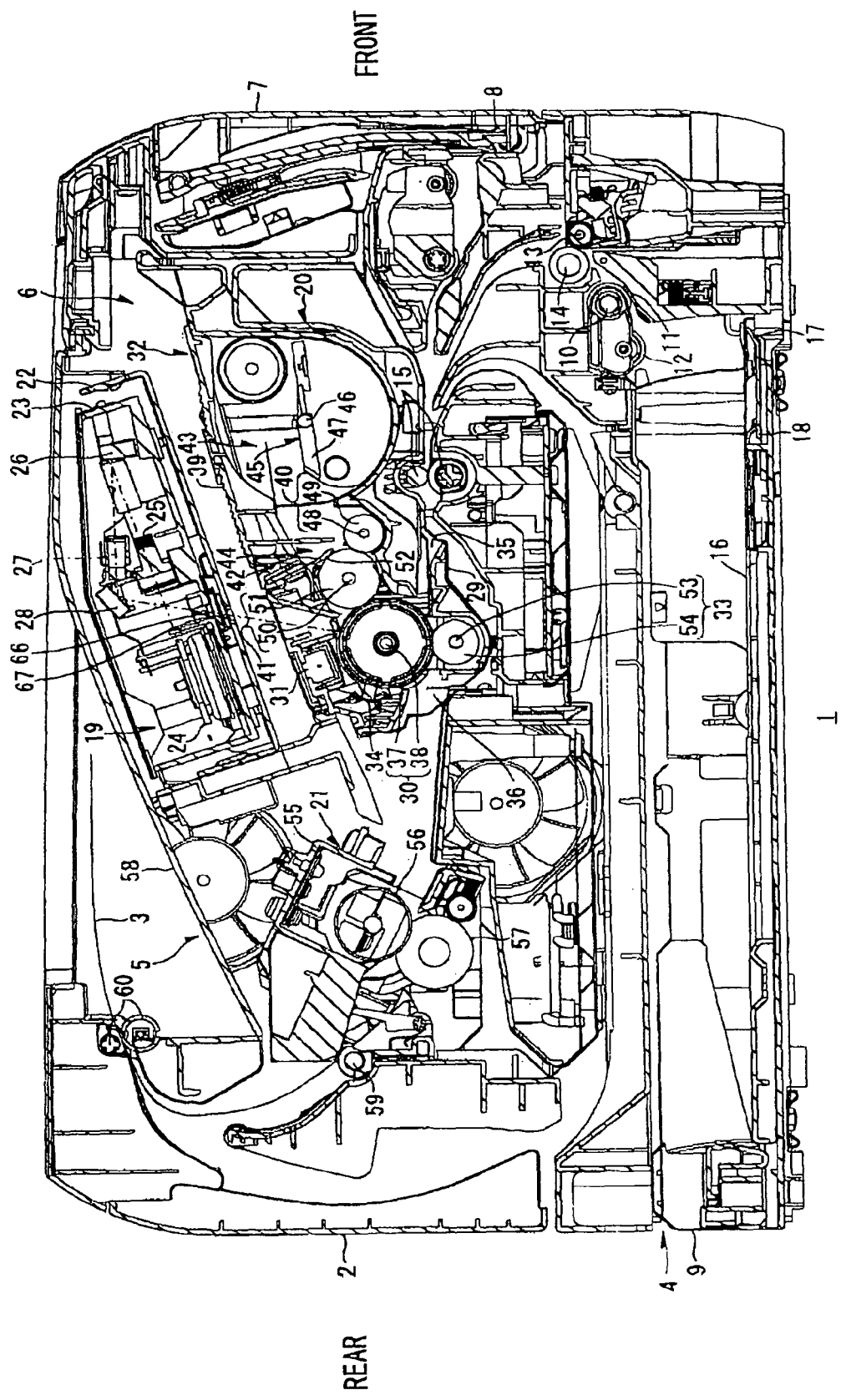
FIG. 1 is a side cross-sectional view of a laser printer serving as the image-forming device of the present invention.

As shown in FIG. 1, the laser printer 1 includes a feeding unit 4 for supplying sheets of paper 3, an image-forming unit 5 for forming images on the paper 3 supplied by the feeding unit 4, and a main casing 2 housing the feeding unit 4 and the image-forming unit 5.

The laser printer 1 also includes an access opening 6 formed in one side wall of the main casing 2 for inserting and removing a process cartridge 20 described later, and a front cover 7 capable of opening and closing over the access opening 6. The front cover 7 is rotatably supported by a cover shaft 8 inserted through a bottom edge of the front cover 7. Accordingly, when the front cover 7 is rotated closed about the cover shaft 8, the front cover 7 covers the access opening 6 as shown in FIG. 1. When the front cover 7 is rotated open about the cover shaft 8, the access opening 6 is exposed, enabling the process cartridge 20 to be mounted into or removed from the main casing 2 via the access opening 6.

In the following description, the side of the laser printer 1 on which the front cover 7 is mounted will be referred to as the "front side," while the opposite side will be referred to as the "rear side."

The feeding unit 4 includes a paper tray 9 that can be inserted into or removed from a lower section of the main casing 2 in the front-to-rear direction, a separating roller 10 and a separating pad 11 disposed above a front end of the paper tray 9, and a feeding roller 12 disposed on the rear side of the separating roller 10 upstream of the separating pad 11 with respect to the conveying direction of the paper 3 (hereinafter referred to as the "paper-conveying direction"). The feeding unit 4 also includes a paper dust roller 13 disposed above and forward of the separating roller 10 and downstream of the separating roller 10 in the paper-conveying direction, and a pinch roller 14 disposed in opposition to the paper dust roller 13.

A paper-conveying path for the paper 3 reverses directions toward the rear side of the laser printer 1, forming a substantial U-shape near the paper dust roller 13. The feeding unit 4 also includes a pair of registration rollers 15 disposed below the process cartridge 20 farther downstream of the U-shaped portion of the paper-conveying path with respect to the paper-conveying direction.

A paper-pressing plate 16 is provided inside the paper tray 9 for supporting the paper 3 in a stacked state. The paper-pressing plate 16 is pivotably supported on the rear end thereof, so that the paper-pressing plate 16 can pivot downward to a resting position in which the paper-pressing plate 16 rests on a bottom plate of the paper tray 9 and can pivot upward to a feeding position in which the paper-pressing plate 16 slopes upward from the rear end to the front end.

When the paper tray 9 is removed from the main casing 2, the paper-pressing plate 16 settles into the resting position. While the paper-pressing plate 16 is in the resting position, the paper 3 can be stacked on the paper-pressing plate 16.

A lever 17 is provided in the front section of the paper tray 9 for lifting the front end of the paper-pressing plate 16 upward. The rear end of the lever 17 is pivotably supported on a lever shaft 18 at a position below the front end of the paper-pressing plate 16 so that the lever 17 can pivot between a level position in which the lever 17 lies along the bottom plate of the paper tray 9 and a sloped position in which the front end of the lever 17 lifts the paper-pressing plate 16 upward. When a driving force is inputted into the lever shaft 18, the lever 17 pivots about the lever shaft 18 and the front end of the lever 17 raises the front end of the paper-pressing plate 16, shifting the paper-pressing plate 16 into the feeding position.

When the paper-pressing plate 16 is in the feeding position, the topmost sheet of paper 3 stacked on the paper-pressing plate 16 is pressed against the feeding roller 12. The rotating feeding roller 12 begins feeding the sheets of paper 3 toward a separating position between the separating roller 10 and the separating pad 11.

When the sheets of the paper 3 become interposed between the separating roller 10 and the separating pad 11, the rotating separating roller 10 separates and feeds the paper 3 one sheet at a time. Each sheet of paper 3 fed by the separating roller 10 passes between the paper dust roller 13 and the pinch roller 14. After the paper dust roller 13 removes paper dust from the sheet of paper 3, the sheet is conveyed along the U-shaped paper-conveying path, thereby reversing directions in the main casing 2, and is conveyed toward the registration rollers 15.

After registering the paper 3, the registration rollers 15 convey the paper 3 to a transfer position between a photosensitive drum 30 and a transfer roller 33 described later, at which position a toner image formed on the photosensitive drum 30 is transferred onto the paper 3

The image-forming unit 5 includes a scanning unit 19, the process cartridge 20, and a fixing unit 21.

The scanning unit 19 is disposed in an upper section of the main casing 2 and includes an outer casing 22 fixed to the main casing 2, and an inner casing 23 fixed to the outer casing 22. Within the inner casing 23, the scanning unit 19 further includes a light source 85 (see FIG. 2), a polygon mirror unit 24, an fθ lens 25, a reflecting mirror 26, an optical face tangle error correction lens 27, and a reflecting mirror 28.

The light source 85 emits a laser beam based on image data. As indicated by the broken line in FIG. 1, the laser beam is deflected and scanned by the polygon mirror unit 24, passes through the fθ lens 25, is reflected in the opposite direction by the reflecting mirror 26, passes through the optical face tangle error correction lens 27, and is reflected downward by the reflecting mirror 28 to be irradiated on the surface of the photosensitive drum 30.

A configuration of the scanning unit 19 will be described later in detail.

As shown in FIG. 1, the process cartridge 20 is provided in the main casing 2 beneath the scanning unit 19 and can be mounted in or removed from the main casing 2 through the access opening 6.

The process cartridge 20 includes a drum frame 29, the photosensitive drum 30, a Scorotron charger 31, a developing cartridge 32, a transfer roller 33, and a cleaning brush 34.

The drum frame 29 is formed with a front side drum opening 35 through which the paper 3 is conveyed from outside the drum frame 29 to the transfer position inside the drum frame 29, and a rear side drum opening 36 through which the paper 3 is conveyed from the transfer position out of the drum frame 29. The front side drum opening 35 is formed through the drum frame 29 along an axial direction of the transfer roller 33 (hereinafter also referred to simply as the "axial direction") at a position below the developer cartridge 32 and in front of the transfer position. The rear side drum opening 36 is formed through the drum frame 29 along the axial direction at a position rearward of the transfer position and opposing the front side drum opening 35 from the opposite side of the transfer position.

The photosensitive drum 30 is disposed in the drum frame 29 and includes a main drum body 37 and a metal drum shaft 38. The main drum body 37 is cylindrical in shape and has a positive charging photosensitive layer formed of polycarbonate or the like on its outer surface. The metal drum shaft 38 extends through the center of the main drum body 37 along the axial direction thereof. The metal drum shaft 38 is supported in the dram frame 29, and the main drum body 37 is rotatably supported relative to the metal drum shaft 38. With this construction, the photosensitive drum 30 is driven to rotate about the metal drum shaft 38 by a driving force inputted from a motor (not shown).

The charger 31 is supported on the drum frame 29 diagonally above and rearward of the photosensitive drum 30. The charger 31 opposes the photosensitive drum 30 but is separated a prescribed distance from the photosensitive drum 30 so as not to contact the same. The charger 31 produces a corona discharge to charge the surface of the photosensitive drum 30 with a uniform positive polarity.

The developer cartridge 32 is detachably mounted on the drum frame 29. Accordingly, the developer cartridge 32 can be inserted in or removed from the main casing 2 while mounted on the drum frame 29 or can be inserted into or removed from the main casing 2 alone, while the drum frame 29 remains in the main casing 2.

The developer cartridge 32 includes a developer casing 39 and, within the developer casing 39, a supply roller 40, a developing roller 41, and a thickness-regulating blade 42.

The developer casing 39 has a box shape that is open on the rear side. The interior of the developer casing 39 is partitioned into a toner-accommodating chamber 43 and a developing chamber 44.

The toner-accommodating chamber 43 occupies a space in the front side of the developer side casing 39 The toner-accommodating chamber 43 is filled with a nonmagnetic, single-component toner having a positive charge. The toner used in this embodiment is a polymerized toner obtained by copolymerizing a polymerized monomer using a well-known polymerization method such as suspension polymerization. The polymerized monomer may be, for example, a styrene monomer such as styrene or an acrylic monomer such as acrylic acid, alkyl (C1-C4) acrylate, or alkyl (C1-C4) meta acrylate. The polymerized toner is formed as particles substantially spherical in shape in order to have excellent fluidity for achieving high-quality image formation.

This type of toner is compounded with a coloring agent, such as carbon black, or wax, as well as an additive such as silica to improve fluidity. The average diameter of the toner particles is about 6-10 μm.

An agitator 43 is disposed in the toner-accommodating chamber 43 for agitating toner accommodated therein. The agitator 45 includes an agitator rotational shaft 46 extending in a widthwise direction (a direction orthogonal to the front-to-rear direction and vertical direction) in substantially the center of the toner-accommodating chamber 43, and an agitating member 47 provided on the agitator rotational shaft 46. The agitator rotational shaft 46 is rotated by a driving force inputted from a motor (not shown) Consequently, the agitating member 47 provided on the agitator rotational shaft 46 moves in a circumferential direction through the toner-accommodating chamber 43 around the agitator rotational shaft 46. As a result, the agitating member 47 stirs toner within the toner-accommodating chamber 43, discharging some of the toner toward the developer chamber 44.

The developing chamber 44 occupies the interior space in the rear side of the developer casing 39. The supply roller 40 is disposed in the developer chamber 44 rearward of a border for the toner-accommodating chamber 43. The supply roller 40 includes a metal roller shaft 48 covered by a sponge roller 49 formed of an electrically conductive foam material. The supply roller shaft 48 extends in the widthwise direction such that both widthwise ends are rotatably supported in the developer casing 39. The supply roller 40 is driven to rotate by a driving force inputted into the roller shaft 48 from a motor (not shown).

The developing roller 41 is disposed inside the developing chamber 44 rearward of the supply roller 40, and contacts the supply roller 40 with pressure so that both are compressed. When the developer cartridge 32 is mounted in the drum frame 29, the developing roller 41 is positioned in confrontation with the photosensitive drum 30 from a position diagonally above and forward thereof. Hence, the developing roller 41 contacts the photosensitive drum 30 at a portion below the vertical center portion that protrudes farthest rearward.

The developing roller 41 includes a metal roller shaft 50, and a rubber roller 51 formed of an electrically conductive rubber material that covers the roller shaft 50. The developing roller shaft 50 extends in the widthwise direction such that both widthwise ends are rotatably supported in the developer casing 39. The rubber roller 51 is more specifically formed of an electrically conductive urethane rubber or silicon rubber containing fine carbon particles, the surface of which is coated with urethane rubber or silicon rubber containing fluorine. The developing roller 41 is driven to rotate by a driving force inputted into the roller shaft 50 from a motor (not shown). Further, a developing bias is applied to the developing roller 41 during a developing operation.

The thickness-regulating member 42 is configured of a metal leaf spring member. A pressing part 52 formed of an insulating silicon rubber and having a semicircular cross section is provided on the free end of the thickness-regulating member 42, The thickness-regulating member 42 extends from a point above the developing roller 41 diagonally downward and forward so that the pressing part 52 elastically contacts the developing roller 41 with pressure.

Toner discharged into the developing chamber 44 is supplied onto the developing roller 41 by the rotating supply roller 40. At this time, the toner is positively tribocharged between the supply roller 40 and the developing roller 41. As the developing roller 41 rotates, the toner supplied to the surface of the developing roller 41 passes between the developing roller 41 and the pressing part 52 of the thickness-regulating blade 42, thereby maintaining a uniform thickness of toner on the surface of the developing roller 41.

The transfer roller 33 is disposed in the drum frame 29 below the photosensitive drum 30 and contacts the photosensitive drum 30 in a vertical direction from the bottom thereof so as to form a nip part with the photosensitive drum 30. The transfer roller 33 includes a metal roller shaft 53 that is covered with a roller 54 formed of an electrically conductive rubber material. The roller shaft 53 extends in the widthwise direction and is rotatably supported in the drum frame 29. The transfer roller 33 is driven to rotate by a driving force inputted from a motor (not shown). Further, a transfer bias is applied to the transfer roller 33 during a transfer operation.

The cleaning brush 34 is attached to the drum frame 29 and confronts the photosensitive drum 30 from the rear side thereof. The cleaning brush 34 contacts the photosensitive drum 30 for scraping off paper dust and the like that has become deposited on the surface of the photosensitive drum 30.

As the photosensitive drum 30 rotates, the charger 31 charges the surface of the photosensitive drum 30 with a uniform positive polarity. Subsequently, a laser beam emitted from the scanning unit 19 is scanned at a high speed over the surface of the photosensitive drum 30, forming an electrostatic latent image corresponding to an image to be formed on the paper 3.

Next, positively charged toner carried on the surface of the developing roller 41 comes into contact with the photosensitive drum 30 as the developing roller 41 rotates and is supplied to areas on the surface of the positively charged photosensitive drum 30 that were exposed to the laser beam and, therefore, have a lower potential. In this way, the electrostatic latent image on the photosensitive drum 30 is transformed into a visible image according to a reverse developing process so that a toner image is carried on the surface of the photosensitive drum 30.

A toner image carried on the surface of the photosensitive drum 30 is transferred onto the paper 3 by the transfer bias applied to the transfer roller 33 as a sheet of paper 3 conveyed by the registration rollers 15 into the drum frame 29 through the front side drum opening 35 passes through the transfer position between the photosensitive drum 30 and the transfer roller 33. After the toner image is transferred onto the paper 3, the paper 3 is conveyed out of the drum frame 29 through the rear side drum opening 36 to the fixing unit 21.

Toner remaining on the photosensitive drum 30 after the transfer operation is recovered by the developing roller 41. Further, paper dust deposited on the photosensitive drum 30 from the paper 3 is recovered by the cleaning brush 40.

The fixing unit 21 is disposed on the rear side of the process cartridge 20 and includes a fixed frame 55, and a heating roller 56 and a pressure roller 57 provided within the fixed frame 55.

The heating roller 56 includes a metal tube, the surface of which is coated with a fluorine resin, and a halogen lamp disposed inside the metal tube for heating the same. The heating roller 56 is driven to rotate by a driving force inputted from a motor (not shown).

The pressure roller 57 is disposed below and contacts the heating roller 56 with pressure The pressure roller 57 includes a metal roller shaft covered with a roller that is formed of a rubber material. The pressure roller 57 follows the rotational drive of the heating roller 56.

In the fixing unit 21, a toner image transferred onto the paper 3 at the transfer position is fixed to the paper 3 by heat as the paper 3 passes between the heating roller 56 and the pressure roller 57 After the toner image is fixed to the paper 3, the paper 3 is conveyed toward a discharge tray 58 formed on the top surface of the main casing 2.

A discharge end paper-conveying path leads from the fixing unit 21 to the discharge tray 58 and is substantially U-shaped for reversing the conveying direction of the paper 3 to a direction toward the front side of the laser printer 1. A pair of conveying rollers 59 is disposed at a midpoint along the discharge end paper-conveying path, and a pair of discharge rollers 60 is disposed at a downstream end of the same path.

Hence, after passing through the fixing unit 21, the paper 3 is conveyed to the discharge rollers 60 along the discharge end paper-conveying path by the conveying rollers 59, and the discharge rollers 60 subsequently receive and discharge the paper 3 onto the discharge tray 58.

Figure 2:
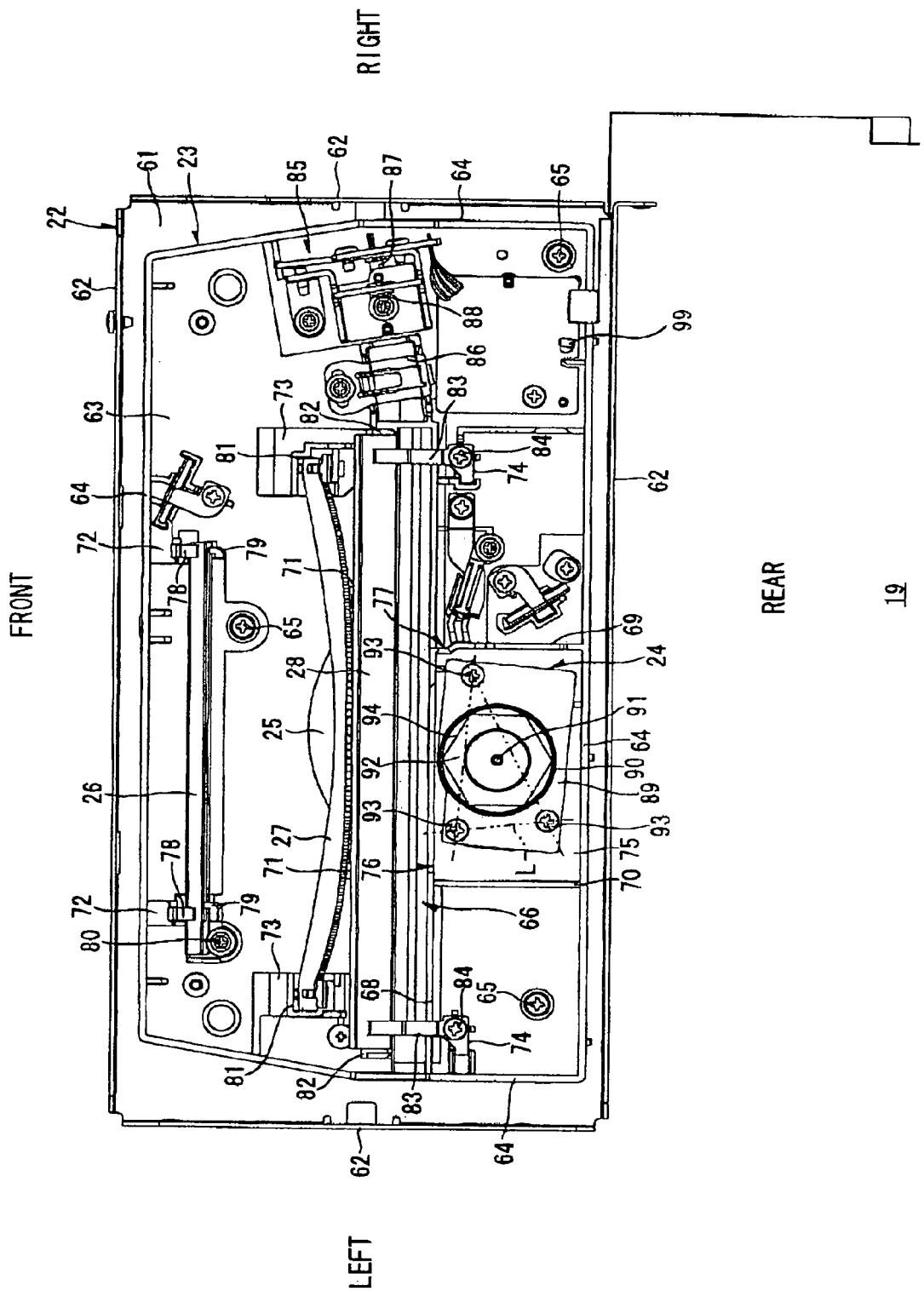
FIG. 2 is a plan view of a scanning unit shown in FIG. 1.

Next, the scanning unit 19 will be described in detail. The outer casing 22 of the scanning unit 19 is formed of a metal plate that is bent. As shown in FIG. 2, the outer casing 22 is integrally provided with a rectangular bottom plate 61 that is longer in the widthwise direction than in the front-to-rear direction, and side plates 62 extend upward from each side edge of the bottom plate 61 and are perpendicular thereto.

The inner casing 23 of the scanning unit 19 is formed of a molded resin into a vessel shape integrally provided with a bottom plate 63 substantially rectangular in shape, and side plates 64 (a front side plate, a rear side plate, a right side plate, and a left side plate) extending upward from the side edges of the bottom plate 63 and are perpendicular thereto. Accommodated inside the outer casing 22, the inner casing 23 is fixed to the bottom plate 61 of the outer casing 22 at three points by three screws 65 inserted through the rear edge of the bottom plate 63 at both widthwise ends and through the front edge of the bottom plate 63 in substantially the widthwise center thereof. The screws 65 are arranged to form the three vertices of a triangular region encompassing the polygon mirror unit 24.

A laser beam opening 66 is formed through the bottom plate 63 to allow passage of a laser beam emitted toward the photosensitive drum 30 (FIG. 1). The laser beam opening 66 has an elongated rectangular shape extending in the widthwise direction from near the side plates 64 on one widthwise side to a position past the widthwise center and is slightly rearward of the front-to-rear center. As shown in FIG. 1, a through-hole 67 is formed through the bottom plate 61 of the outer casing 22 at a position corresponding to the laser beam opening 66 to allow passage of the laser beam exiting from the laser beam opening 66.

Erected from the bottom plate 63 and integrally formed therewith are a widthwise rib 68 and front-to-rear ribs 69 and 70 for reinforcing the inner casing 23; a pair of fθ lens support units 71 for supporting the fθ lens 25; a pair of reflecting mirror support units 72 for supporting the reflecting mirror 26; a pair of lens/mirror support units 73 for supporting both the optical face tangle error correction lens 27 and the reflecting mirror 28; and two spring support units 74 for supporting restraining springs 83 described later.

The widthwise rib 68 extends in the widthwise direction along the entire width of the laser beam opening 66 and is erected from the rear edge of the laser beam opening 66 in a direction perpendicular to the bottom plate 63. The front surface of the widthwise rib 68 is flush with a rear endface of the bottom plate 63 defining the laser beam opening 66.

Since the widthwise rib 68 extends in the widthwise direction along the entire longitudinal length of the laser beam opening 66, the longitudinal edges along the laser beam opening 66 can be reinforced, preventing deformation (warping) in these edges.

The front-to-rear ribs 69 and 70 are erected perpendicular to the bottom plate 63 and are spaced apart in the widthwise direction. The front-to-rear ribs 69 and 70 extend parallel to each other in the front-to-rear direction from midpoints of the widthwise rib 68 to the rear side plate 64. Accordingly, the rear side plate 64, the widthwise rib 68, and the front-to-rear ribs 69 and 70 define a rectangular region 75 to the rear side of the laser beam opening 66. The rectangular region 75 serves as an area for providing the polygon mirror unit 24.

The widthwise rib 68 and the front-to-rear ribs 69 and 70 are formed taller than the top surface of a polygon mirror 92 described later, An output side opening 76 is formed in the widthwise rib 68 by cutting out a substantially rectangular shape from the top edge of the widthwise rib 68 at a position opposing the polygon mirror unit 24 for allowing passage of a laser beam that has been deflected and scanned by the polygon mirror unit 24. An input side opening 77 is formed in the front-to-rear rib 69 positioned on the side of the polygon mirror unit 24 nearest the light source 85 described later by cutting out a slit shape having a narrow front-to-rear dimension from the upper edge of the front-to-rear rib 69 on the end adjacent to the widthwise rib 68 for allowing a laser beam emitted from the light source 85 to pass into the rectangular region 75.

The pair of fθ lens support units 71 is disposed on the front side of the laser beam opening 66, spaced apart in the widthwise direction for supporting both widthwise ends of the fθ lens 25.

The pair of reflecting mirror support units 72 is disposed in close contact with the front side plate 64, spaced at intervals in the widthwise direction for supporting both widthwise ends of the reflecting mirror 26. Flexible support members 78 are disposed on rear surfaces of the reflecting mirror support units 72. The flexible support members 78 are formed of metal plates having flexibility and are bent to form a substantially C-shaped cross section. The reflecting mirror 26 rests in the flexible support members 78 so that the upper edge leans toward the front side plate 64. The upper ends of the flexible support members 78 restrain the reflecting mirror 26 from above, while the lower ends elastically support the reflecting mirror 26 through contact with the front surface thereof. Contact parts 79 are integrally formed on the reflecting mirror support units 72 for contacting the upper end of the reflecting mirror 26 from the rear side.

An angle adjusting screw 80 is provided in one of the reflecting mirror support units 72 for adjusting the mounted angle of the reflecting mirror 26 (inclination angle relative to the bottom plate 63). That is, since the inner casing 23 is manufactured of molded resin in this embodiment, manufacturing errors can occur in the inner casing 23. If the inner casing 23 has such a manufacturing error, the mounted angle of the reflecting mirror 26 with respect to the inner casing 23 may not be an appropriate angle, leading to such problems as the laser beam reflected off the reflecting mirror 26 not be incident on the center of the optical face tangle error correction lens 27.

Figure 5A:
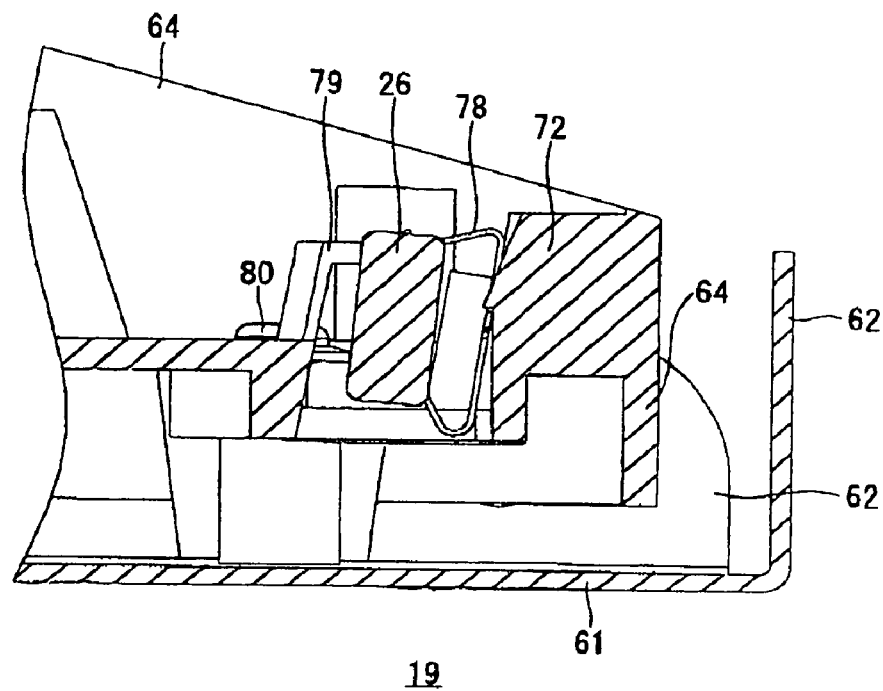
FIG. 5(*a*) is a cross-sectional views of the scanning unit showing a region near a reflecting mirror support unit shown in FIG. 2.
FIG. 5(b) is a cross-sectional views of the scanning unit showing a region near a reflecting mirror support unit shown in FIG. 2.
Figure 5B:
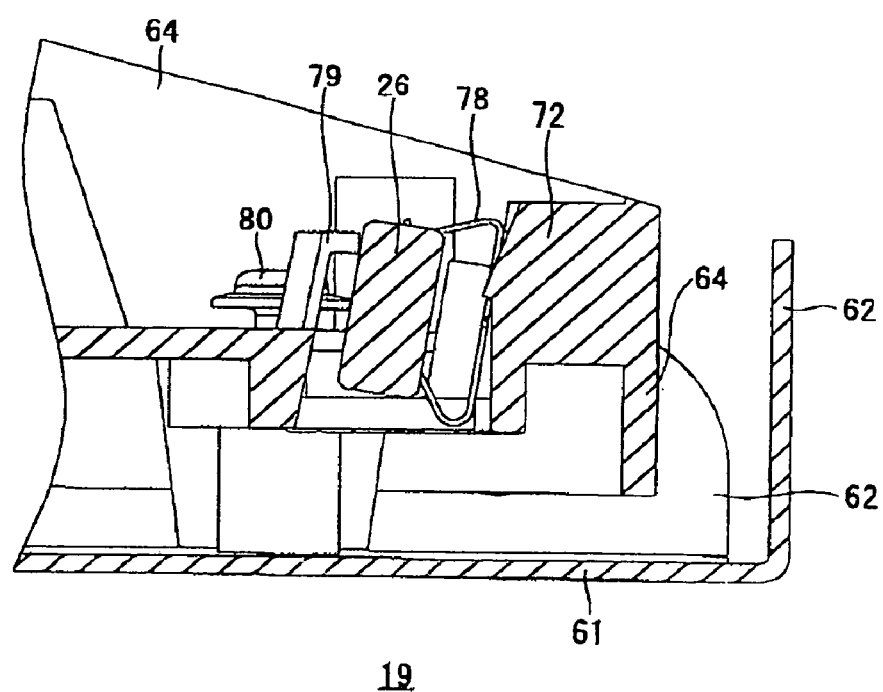

In this embodiment, the head of the angle adjusting screw 80 contacts one widthwise end of the reflecting mirror 26, and the mounted angle of the reflecting mirror 26 is adjusted by screwing in or out the angle adjusting screw 80 vertically to adjust the height of the screw head. Specifically, as shown in FIG. 5(a), when the angle adjusting screw 80 is rotated so as to lower the screw head, the angle adjusting screw 80 contacts the reflecting mirror 26 at a lower position, pressing the lower portion of the reflecting mirror 26 forward against the elastic force of the flexible support member 78 so that the reflecting mirror 26 becomes more erect. However, when the angle adjusting screw 80 is rotated to raise the screw head as shown in FIG. 5(b), the angle adjusting screw 80 contacts the reflecting mirror 26 at a higher position, allowing the elastic force of the flexible support members 78 to push the looser end of the reflecting mirror 26 rearward, so that the reflecting mirror 26 is more inclined.

Accordingly, the laser beam reflected by the reflecting mirror 26 can be directed to the center of the optical face tangle error correction lens 27, and the optical face tangle error correction lens 27 can properly correct error in the scanning position of the laser beam caused by face tangle error of the reflecting surfaces 94 on the polygon mirror 92. As a result, this construction can ensure a stable scanning position of the laser beam on the surface of the photosensitive drum 30.

Figure 3:
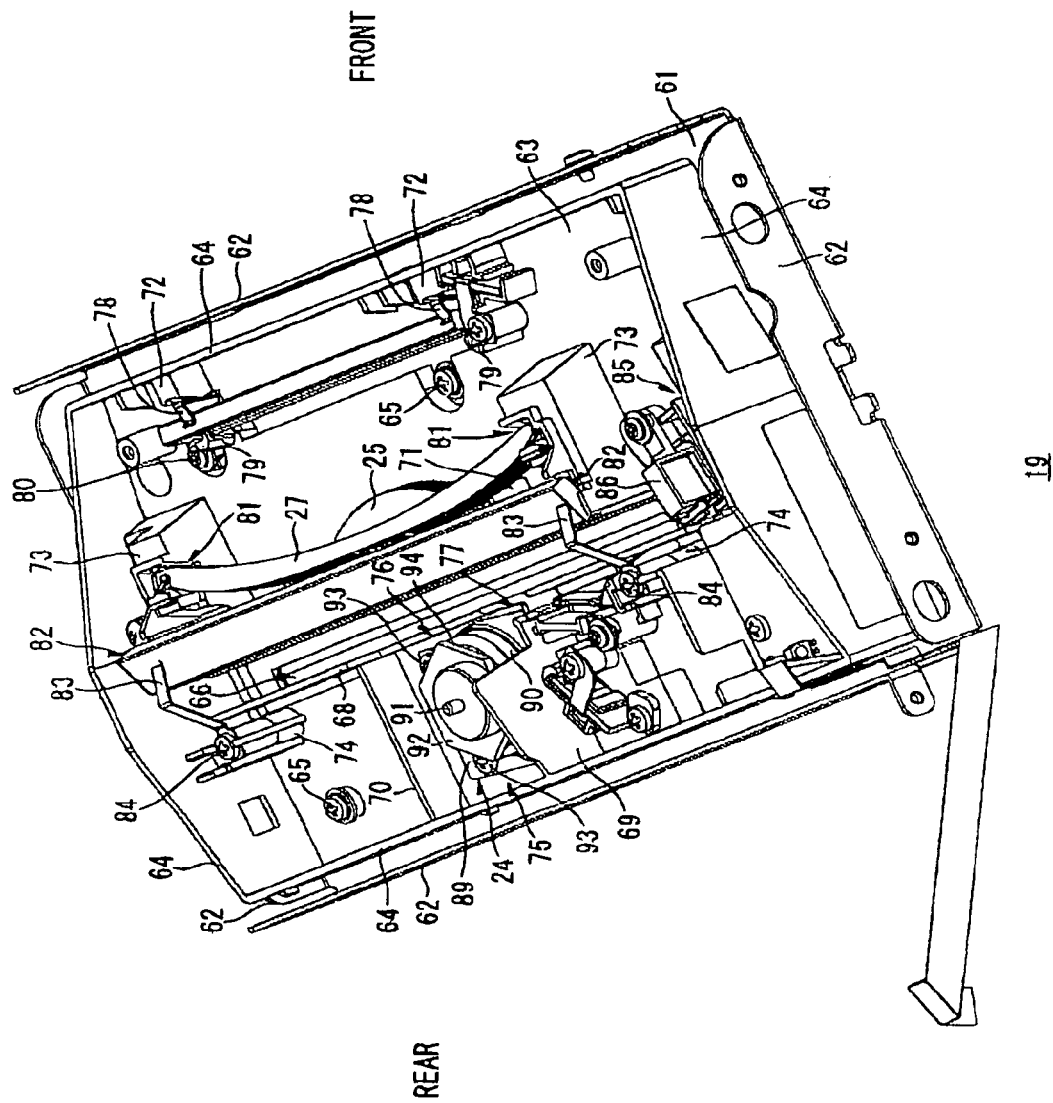
FIG. 3 is a perspective view of the scanning unit in FIG. 1 from a point diagonally above and rearward thereof.
Figure 4:
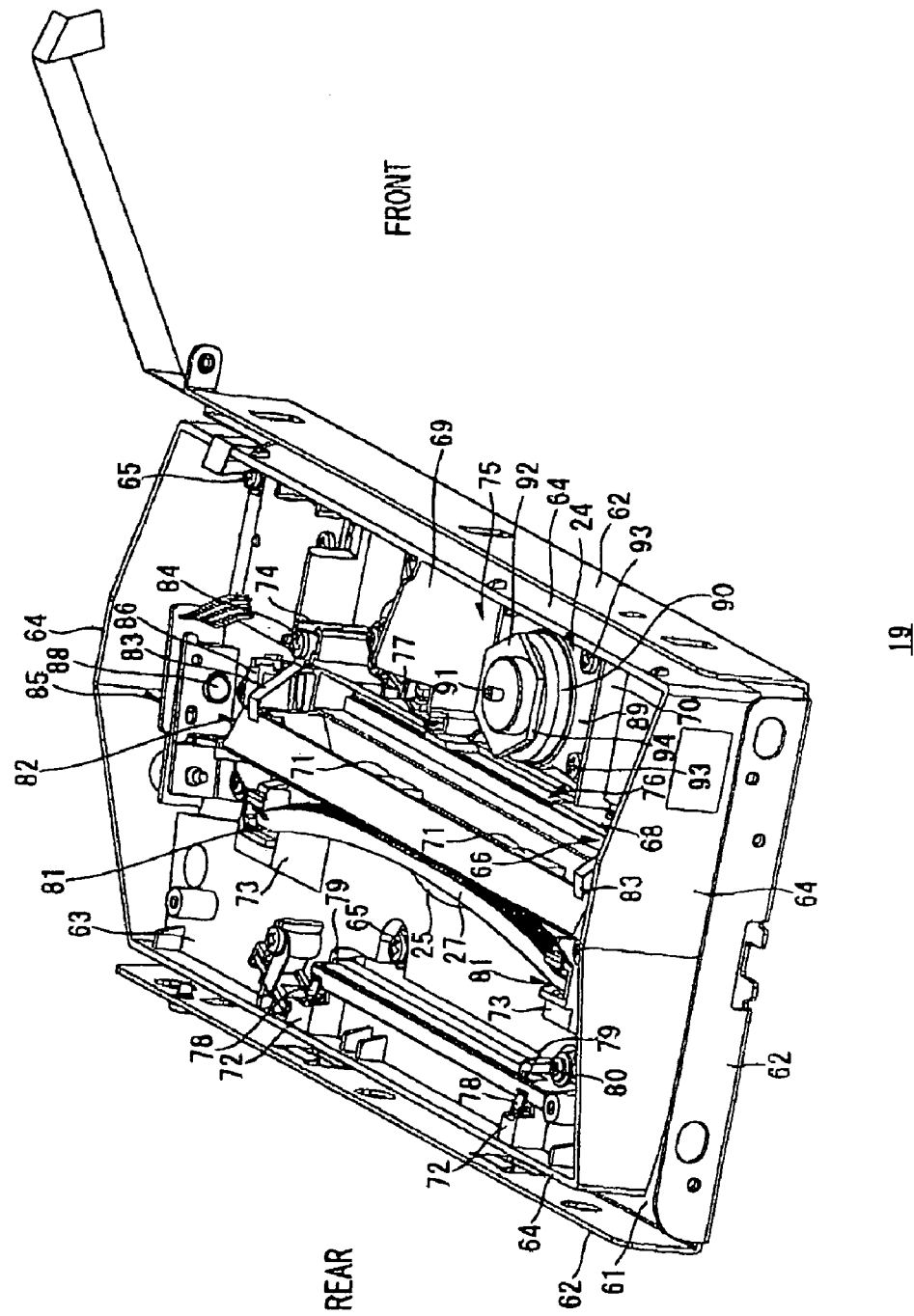
FIG. 4 is a perspective view of the scanning unit in FIG. 1 from a point diagonally above and forward thereof.

As shown in FIGS. 2 through 4, the pair of the lens/mirror support units 73 is provided forward of the laser beam opening 66 for supporting the optical face tangle error correction lens 27 and the reflecting mirror 28. The lens/mirror support units 73 are spaced at an interval in the widthwise direction wider than the interval between the pair of fθ lens support units 71. Each lens/mirror support unit 73 includes a lens receiving part 81 formed higher than the fθ lens support units 71 for receiving the optical face tangle error correction lens 27, and a mirror receiving part 82 formed rearward of the lens receiving part 81 and slightly higher than the same for receiving the reflecting mirror 28. With this construction, the optical face tangle error correction lens 27 is positioned higher than the fθ lens 25, forming a gap between the optical face tangle error correction lens 27 and bottom plate 63 through which light deflected from the polygon mirror unit 24 can pass toward the reflecting mirror 26. This structure eliminates the need to allocate space on the side of the optical face tangle error correction lens 27 for allowing passage of the laser beam toward the reflecting mirror 26, thereby reducing the size of the laser printer 1. The reflecting mirror 28 is disposed at a higher position than the optical face tangle error correction lens 27.

By supporting both the optical face tangle error correction lens 27 and the reflecting mirror 28 with common lens/mirror support units 73, it is possible to reduce the size and number of components in the laser printer 1 to achieve a simpler construction than when separate members are provided for supporting the optical face tangle error correction lens 27 and the reflecting mirror 28.

The spring support units 74 are substantially cylindrical in shape and are disposed rearward of the widthwise rib 68 at positions opposing the lens/mirror support units 73 in the front-to-rear direction. A base end of each restraining spring 83 is fixed to the top end of each spring support unit 74 by a screw 84. Each restraining spring 83 is formed of a narrow metal plate having elasticity that is bent substantially into the shape of a turn crank so as to extend forward from the top end of the respective spring support unit 74 over the top of the laser beam opening 66 such that the free end of the restraining spring 83 presses the respective widthwise end of the reflecting mirror 28 toward the respective mirror receiving part 82 from above.

This construction effectively uses the space above the laser beam opening 66 by providing the restraining springs 83 over the top of the laser beam opening 66, thereby reducing the size of the laser printer 1.

The light source 85 and a cylindrical lens 86 are disposed to a widthwise side of one of the lens/mirror support units 73.

The light source 85 is disposed near the right side plate 64 at a substantially central region in the front-to-rear direction. The light source 85 includes a semiconductor laser 87 (photodiode) and a collimator lens 88 for converting a laser beam emitted from the semiconductor laser 87 into parallel rays.

The cylindrical lens 86 is disposed between the right one of the lens/mirror support units 73 and the light source 85 along the optical path of the laser beam. The laser beam emitted from the light source 85 passes through the cylindrical lens 86 so as to be converged in the subscanning direction and continues toward the rectangular region 75.

Although not shown in the drawings, a monitor diode is provided adjacent to the semiconductor laser 87 for monitoring the light intensity for stabilizing the optical output of the semiconductor laser 87.

The scanning unit 19 also includes a write position sensor 99 (FIG. 2) disposed in the rear and right section of the main casing 2. The write position sensor 99 is for aligning the writing position of image signals on the photosensitive drum 30.

The polygon mirror unit 24 is disposed in the rectangular region 75 Hence, the polygon mirror unit 24 is housed in the inner casing 23 to the rear of the laser beam opening 66, while the fθ lens 25, the reflecting mirror 26, the optical face tangle error correction lens 27, the reflecting mirror 28, the light source 85, and the cylindrical lens 86 are housed in the inner casing 23 to the front of the laser beam opening 66.

The polygon mirror unit 24 includes a base plate 89, a polygon motor 90, and the polygon mirror 92. The base plate 89 has a substantially rectangular shape in which the length of the longer sides is shorter than the longitudinal dimension of the laser beam opening 66. The polygon motor 90 is disposed on the base plate 89 and has a drive shaft 91. The polygon mirror 92 is supported on the drive shaft 91 of the polygon motor 90. The polygon mirror unit 24 is provided inside the rectangular region 75 and is fixed to the bottom plate 63 by three screws 93 inserted through the base plate 89.

The screws 93 are arranged so that a straight line L passing through any two screws 93 intersects a line along the longitudinal direction of the laser beam opening 66. The screws 93 are arranged so that a triangular region formed with the screws 93 as vertices encompasses the drive shaft 91 of the polygon motor 90.

The polygon mirror 92 is formed in the shape of a polygon (hexagon, for example) having a plurality of reflecting surfaces 94. The drive shaft 91 is inserted into the center of the polygon mirror 92 for supporting the same. When the polygon motor 90 operates, the drive shaft 91 and, consequently, the polygon mirror 92 rotate at a high speed.

With this construction, a laser beam emitted from the light source 85 passes through the cylindrical lens 86 and enters the rectangular region 75 via the input side opening 77 formed in the front-to-rear rib 69. Hence, when passing through the input side opening 77, the width of the laser beam in the main scanning direction (direction parallel to the bottom plate 63) is restricted to a sufficiently small width governed by the width of the input side opening 77 in the front-to-rear direction. The front-to-rear rib 69 blocks any excess width of the laser beam in the main scanning direction.

After passing through the input side opening 77, the laser beam is incident on the reflecting surfaces 94 of the polygon mirror 92, which is rotating at a high rate of speed, and is deflected by the reflecting surfaces 94 so as to be scanned at an equiangular speed in the main scanning direction. Deflected and scanned in this way, the laser beam travels out of the rectangular region 75 through the output side opening 76 formed in the widthwise rib 68, passes through the gap between the optical face tangle error correction lens 27 and the bottom plate 63 and is incident on the fθ lens 25.

The fθ lens 25 converts the laser beam scanned at an equiangular speed by the polygon mirror 92 (polygon mirror unit 24) into light scanned at a constant speed over the surface of the photosensitive drum 30. After passing through the fθ lens 25, the laser beam is reflected by the reflecting mirror 26 back along an obliquely upward and rearward optical path and is incident on the optical face tangle error correction lens 27. The optical face tangle error correction lens 27 functions to correct error in the scanning position of the laser beam caused by the optical face tangle error of the reflecting surfaces 94 (inclination of the reflecting surfaces 94 relative to the drive shaft 91 of the polygon motor 90). The beam that has passed through the optical face tangle error correction lens 27 is reflected by the reflecting mirror 28 along an obliquely rearward and downward optical path, passes sequentially through the laser beam opening 66 and the through-hole 67, and is irradiated on the surface of the photosensitive drum 30.

With this construction, the polygon mirror unit 24 (polygon mirror 92) is maintained in the inner casing 23 on the rear side of the laser beam opening 66, while an scanning optical system including the fθ lens 25, the reflecting mirror 26, the optical face tangle error correction lens 27, and the reflecting mirror 28 is maintained in the inner casing 23 on the front side of the laser beam opening 66, opposite the polygon mirror unit 24. Therefore, vibrations of the polygon mirror unit 24 that are produced in the rear section of the inner casing 23 housing the polygon mirror unit 24 (the section to the rear of the laser beam opening 66) are blocked by the laser beam opening 66 and prevented from being transmitted to the front section of the inner casing 23 housing the scanning optical system (the section forward of the laser beam opening 66). Hence, this construction reduces vibrations in the scanning optical system caused by vibrations in the polygon mirror unit 24. Further, even if the vibrations in the polygon mirror unit 24 change the reflected angle of the laser beam in the subscanning direction, this change is corrected by the scanning optical system and, hence, does not produce displacement in the scan line. Therefore, this construction can reduce displacement in the scan line due to vibrations in the polygon mirror unit 24, thereby stabilizing the scanning position of the laser beam on the surface of the photosensitive drum 30. Moreover, unlike a structure that increases the number of reinforcing ribs in the inner casing 23, this structure does not increase the complexity of the inner casing 23, avoiding an increase in manufacturing costs for the inner casing 23.

Further, the light source 85 is housed in the inner casing 23 on the same side of the laser beam opening 66 as the scanning optical system, that is, the section on the front of the laser beam opening 66. This construction can reduce vibrations in the light source 85 caused by vibrations in the polygon mirror unit 24, thereby further stabilizing the scanning position of the laser beam on the surface of the photosensitive drum 30.

Further, the base plate 89 of the polygon mirror unit 24 is formed with a length smaller than the longitudinal dimension of the laser beam opening 66. Accordingly, if vibrations in the polygon mirror unit 24 transferred to the inner casing 23 via the base plate 89 do not travel around longitudinal ends of the laser beam opening 66, the vibrations will not be transferred to the front section of the inner casing 23 housing the scanning optical system. Hence, this structure more effectively prevents vibrations in the polygon mirror unit 24 from being transferred to the scanning optical system, thereby further reducing vibrations in the scanning optical system caused by vibrations in the polygon mirror unit 24.

Further, by arranging the three screws 93 for fixing the base plate 89 to the inner casing 23 so that a straight line L passing through any two screws 93 intersects a line along the longitudinal direction of the laser beam opening 66, it is possible to further reduce vibrations in the scanning optical system caused by vibrations in the polygon mirror unit 24. In other words, when the polygon mirror unit 24 (base plate 89) vibrates, the inner casing 23 vibrates between the screws 93, with the screws 93 acting as nodal points. Since these vibrations propagate through the inner casing 23, if a straight line L passing through two of the screws 93 is a line parallel to the longitudinal direction of the laser beam opening 66, the vibrations of the inner casing 23 between these screws 93 will generate vibrations in the edges of the laser beam opening 66 along the longitudinal direction thereof, with the longitudinal ends acting as nodal points. However, if a straight line passing through any two screws 93 intersects a line along the longitudinal direction of the laser beam opening 66, vibrations are not produced in the peripheral edges of the laser beam opening 66, thereby further reducing vibrations in the scanning optical system caused by vibrations in the polygon mirror unit 24.

Moreover, the use of three screws 93 securely fastens the base plate 89 to the inner casing 23. That is, the base plate 89 can be securely fixed to the inner casing 23 with three screws 93. However, using four or more screws 93 to fix the base plate 89 to the inner casing 23, may produce warping in the inner casing 23 or the base plate 89, making the fixed state of the base plate 89 less stable. By fixing the base plate 89 to the inner casing 23 with three screws 93, it is possible to prevent the occurrence of warping in the inner casing 23 or the base plate 89 so that the fixed state of the base plate 89 is stable. In addition, since the drive shaft 91 of the polygon motor 90 is disposed within the triangular region formed by the screws 93 as vertices, the base plate 89 can be fixed to the inner casing 23 with more stability, Therefore, this structure suppresses the transfer of vibrations from the polygon mirror unit 24 to the inner casing 23, thereby further reducing vibrations in the scanning optical system caused by vibrations in the polygon mirror unit 24.

Further, the inner casing 23 can be securely fixed to the outer casing 22 with three screws 65. In addition, since the polygon mirror unit 24 is disposed in a triangular region formed by the three screws 65 as vertices, the inner casing 23 can be fixed more securely to the outer casing 22, thereby suppressing the transfer of vibrations from the polygon mirror unit 24 to the outer casing 22 via the inner casing 23. Accordingly, this construction prevents vibrations in the polygon mirror unit 24 from being transferred to the scanning optical system via the outer casing 22, thereby further stabilizing the scanning position of the laser beam on the surface of the photosensitive drum 30.

By providing the laser printer 1 with this type of scanning unit 19 capable of reducing vibrations in the scanning optical system caused by vibrations in the polygon mirror unit 24, the laser printer 1 can stabilize the scanning position of the laser beam on the surface of the photosensitive drum 30. Accordingly, the laser printer 1 can form high duality electrostatic latent images on the photosensitive drum 30, thereby achieving high quality image formation.

Here, increasing the rotational speed of the polygon mirror 92 causes the problem of the laser beam reflecting off the reflecting surfaces 94 of the rotating polygon mirror 92 and striking the photosensitive member 30 as stray light. Further, when light reflected off the reflecting surfaces 94 of the polygon mirror 92, returns to the semiconductor laser 87, optical feedback noise is generated, the effects of which can lead to unstable oscillation of the semiconductor laser 87. Further, problems in, the printer operations may result if stray light strikes the monitor diode (not shown) or an optical sensor such as the write position sensor 99 or the like. For example, if stray light hits the monitor diode (not shown), the laser printer 1 may mistakenly perform an operation that reduces the stability of the semiconductor laser output. The configuration disclosed in above-mentioned Japanese Patent No. 3,137,195 cannot completely prevent the portion of the laser beam that reflects off of an undesirable reflecting surface of the polygon mirror or a member other than the polygon mirror, and cannot prevent stray light from being generated through this reflection.

In the present embodiment, the these problems are overcome as follow.

Figure 6:
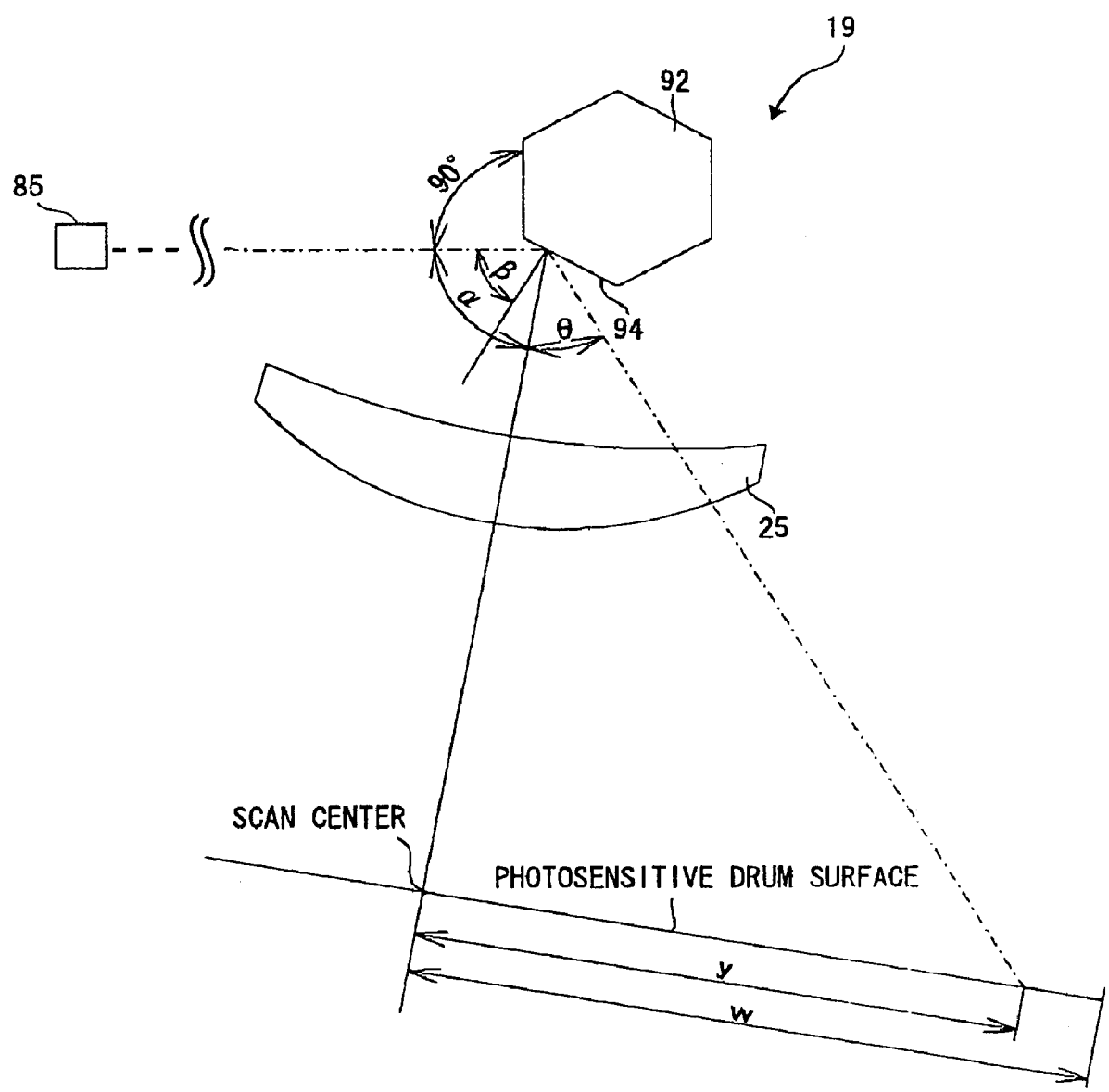
FIG. 6 is an explanatory diagram showing a more detailed arrangement of an fθ lens, light source, and polygon mirror shown in FIG. 2.

FIG. 6 is an explanatory diagram illustrating a specific arrangement of the fθ lens 25, the light source 85, and the polygon mirror 92. These components are arranged in the scanning unit 19 so that a reflecting surface 94 different from the reflecting surface 94 orthogonal to the optical path of the laser beam incident on the polygon mirror 92 reflects the laser beam for forming an image on the surface of the photosensitive drum 30.

More specifically, the fθ lens 25, the light source 85, and the polygon mirror 92 are arranged to satisfy equation (1) below.

$$\alpha/2 + W/(2 \cdot f) - 2\pi/N > 0 \quad (1)$$

wherein: α is an angle formed by the optical path of the laser beam from the light source 85 to a point of reflection on the reflecting surface 94 of the polygon mirror 92 (incident point) and a straight line connecting this incident point with a scan center (center point in the main scanning direction of the laser beam within a region in which the laser beam is scanned over the surface of the photosensitive drum 30 (hereinafter referred to as "effective scanning region"));

W is the distance from the scan center to an end of the effective scanning region in the main scanning direction (½ the effective scanning region in the main scanning direction);

f is the focal length of the fθ lens 25; and

N is the number of reflecting surfaces 94 possessed by the polygon mirror 92.

This equation (1) is obtained from following equations (1) to (5). That is, the expression in equation (2) below is satisfied by the properties of the fθ lens 25.

$$y = f \times \theta \quad (2)$$

where y is the distance between the scan center and the position at which the laser beam deflected by the reflecting surface 94 is forming an image on the surface of the photosensitive drum 30; and θ is the angle formed by the optical path of the laser beam reflected off the reflecting surface 94 and a straight line from the point of reflection to the scan center.

If the distance y is shorter than the distance W, then the laser beam reflected off the reflecting surface 94 of the polygon mirror 92 is irradiated within the effective scanning region. Hence, if equation (3) below is satisfied, the laser beam reflected off a reflecting surface 94 different from the reflecting surface 94 orthogonal to the optical path of the incident laser beam forms an image on the surface of the photosensitive drum 30.

$$W > y \quad (3)$$

On the other hand, the angle θ can be represented by equation (4) below.

$$\theta = 2 \times \beta - \alpha \quad (4)$$

wherein β is the angle formed by the optical path of the laser beam incident on the reflecting surface 94 of the polygon mirror 92 and the normal to the reflecting surface 94.

Since the angle β is 2π/N, we can substitute this expression into equation (4), as follows.

$$\theta = 2 \times 2\pi/N - \alpha \quad (5)$$

By substituting equations (2) and (5) into equation (3), we get the following $$W > f \times \theta = f \times (2 \times 2\pi/N - \alpha)$$

This can be reordered to obtain equation (1). Hence, when the fθ lens 25, the light source 85, and the polygon mirror 92 are arranged to satisfy equation (1) described above, the laser beam reflected off the reflecting surface 94 different from the reflecting surface 94 orthogonal to the optical path of the incident laser beam forms an image on the surface of the photosensitive drum 30. By reflecting the laser beam off a reflecting surface 94 other than the reflecting surface 94 orthogonal to the optical path of the incident laser beam, it is possible to prevent the reflected laser beam from returning to the light source 85 or from striking the monitor diode (not shown), thereby ensuring stable laser beam output from the light source 85 (semiconductor laser 87).

In the construction described above, the front-to-rear rib 69 is disposed between the light source 85 and the polygon mirror unit 24 (polygon mirror 92) and near the polygon mirror unit 24 for restricting the width of the laser beam emitted from the light source 85 to a width corresponding to the input side opening 77 in the main scanning direction as the laser beam passes through the input side opening 77 formed in the front-to-rear rib 69. By forming the input side opening 77 in the front-to-rear rib 69 as an aperture for restricting the main scanning direction width of the laser beam in this way, it is possible to effectively block stray light emitted from the polygon mirror unit 24 toward the light source 85. Hence, if a laser beam emitted from the light source 85 and incident on the polygon mirror 92 generates stray light, it is possible to prevent this stray light from striking the surface of the photosensitive drum 30, the monitor diode, the write position sensor 99, and the like, even when the rotational speed of the polygon mirror 92 is increased.

Further, since the stray light is generated when the laser beam is deflected and scanned by the polygon mirror 92 and is primarily scattered in the main scanning direction, such stray light can be effectively prevented by restricting the width in the main scanning direction of the laser beam passing through the input side opening 77. Further, since the input side opening 77 is shaped as an opening in the subscanning direction, the structure of the mold for forming the inner casing 23 is simple to produce, thereby enhancing productivity.

Moreover, the widthwise rib 68 functions to block unnecessary laser beams deflected from the polygon mirror 92 (a laser beam not guided toward the surface of the photosensitive drum 30). Hence, this construction eliminates the need to provide a separate means for blocking this type of unnecessary laser beam, thereby reducing the number of required parts and simplifying the structure of the laser printer 1.

Since the laser printer 1 is provided with the scanning unit 19 capable of preventing the generation of stray light even when the rotational speed of the polygon mirror 92 is increased, it is possible to increase the operating speed of the laser printer 1 while preventing stray light from striking the photosensitive drum 30. As a result, high quality electrostatic latent images can be formed on the photosensitive drum 30 to achieve high quality image formation.

Figure 7:
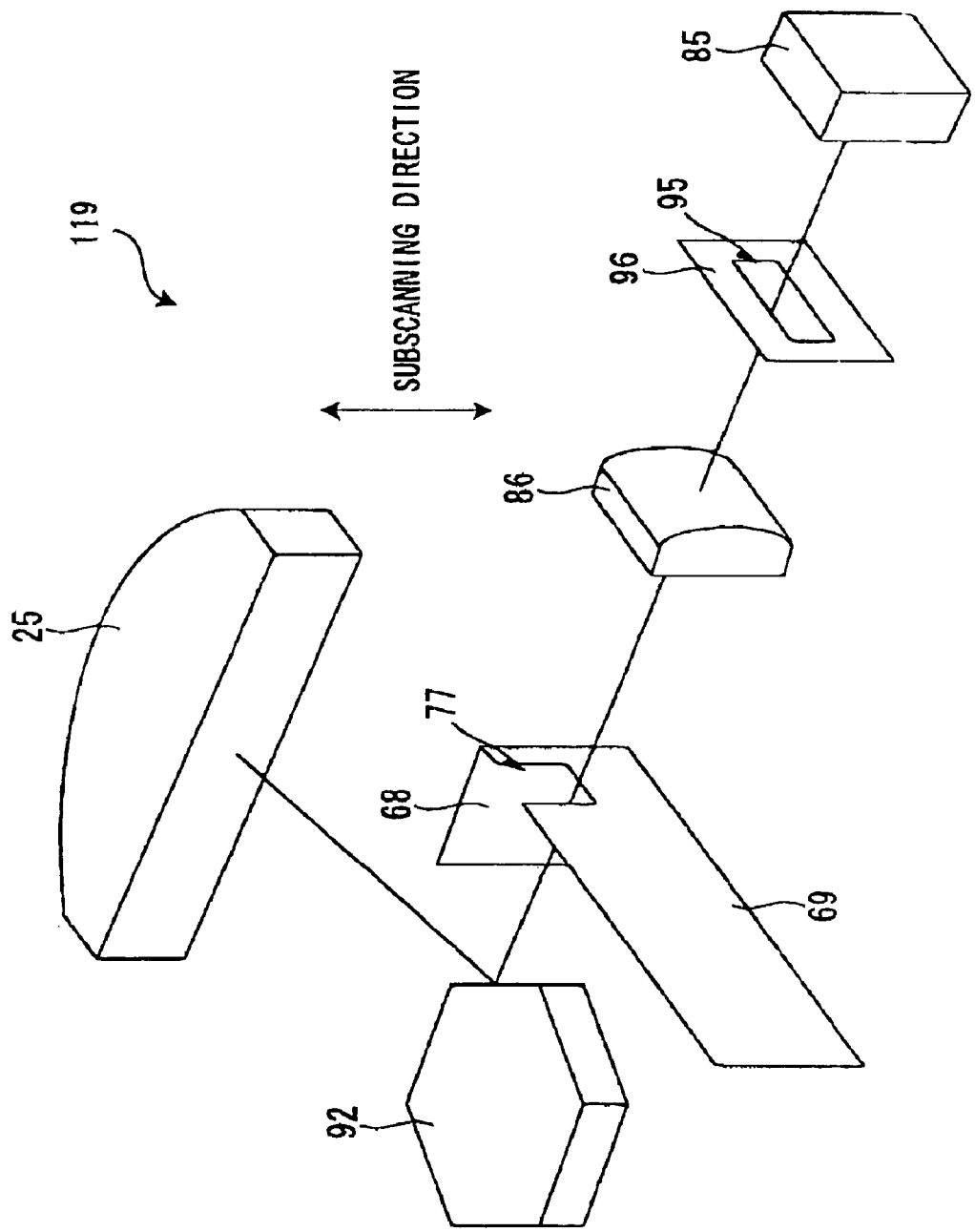
FIG. 7 is a perspective view schematically illustrating a scanning unit according to a second embodiment of the present invention.

Next, a scanning unit 119 according to a second embodiment of the present invention will be described FIG. 7 is a perspective view schematically illustrating the scanning unit 119, wherein like parts and components are designated with the same reference numerals to avoid duplicating description.

In the structure shown in FIG. 7, an aperture plate 96 is disposed between the light source 85 and the cylindrical lens 86. The aperture plate 96 is formed with a rectangular aperture 95 that is wider than the input side opening 77 in the main scanning direction. A laser beam emitted from the light source 85 first passes through the aperture 95 of the aperture plate 96 and subsequently passes through the cylindrical lens 86 and the input side opening 77 before striking the polygon mirror 92.

By directing the laser beam through the aperture 95 of the aperture plate 96, this construction can restrict the width of the laser beam in both the main scanning direction and the subscanning direction. In other words, the aperture plate 96 can restrict the width of the laser beam in the main and subscanning directions before the input side opening 77 restricts the width of the laser beam in the main scanning direction. Hence, this construction can prevent stray light occurring when the laser beam strikes the front-to-rear rib 69, producing scattered light, thereby more reliably preventing stray light from reaching the surface of the photosensitive drum 30.

Further, a mold for forming the input side opening 77 in the front-to-rear rib 69 can be made in a simple shape while the aperture plate 96 accurately restricts the light in the subscanning direction.

Figure 8:
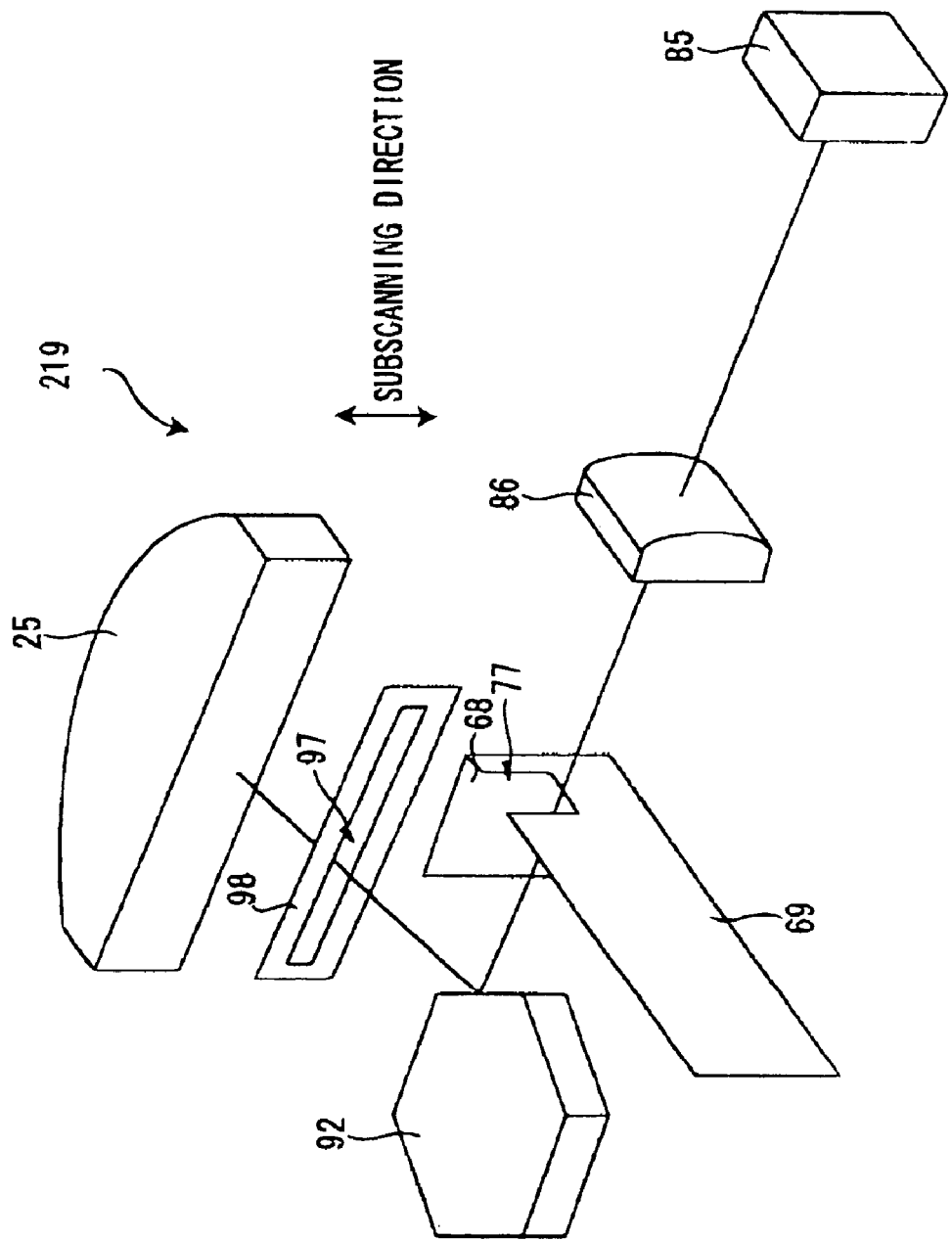
FIG. 8 is a perspective view schematically illustrating a scanning unit according to a third embodiment of the present invention.

Next, a scanning unit 219 according to a third embodiment of the present invention will be described. FIG. 8 is a perspective view schematically illustrating the scanning unit 219, wherein like parts and components are designated with the same reference numerals to avoid duplicating description.

In the structure shown in FIG. 8, an aperture plate 98 is disposed between the polygon mirror 92 and the fθ lens 25 The aperture plate 98 is formed with a rectangular aperture 97 elongated in the main scanning direction. With this construction, the laser beam deflected and scanned by the polygon mirror 92 passes through the aperture 97 of the aperture plate 98 prior to being incident on the fθ lens 25. Therefore, the aperture 97 of the aperture plate 98 restricts the width of the laser beam in the subscanning direction before the laser beam reaches the fθ lens 25.

With this construction, the input side opening 77 of the front-to-rear rib 69 restricts the width of the laser beam in the main scanning direction before the laser beam is incident on the polygon mirror 92, and the aperture plate 98 restricts the width of the laser beam in the subscanning direction after the laser beam has been deflected by the polygon mirror 92. By restricting the width of the laser beam in the subscanning direction, this construction can prevent the laser beam from crossing over the edges of the fθ lens 25 in the subscanning direction, thereby more efficiently preventing stray light generated on or around the polygon mirror 92 from reaching the surface of the photosensitive drum 30.

Figure 9:
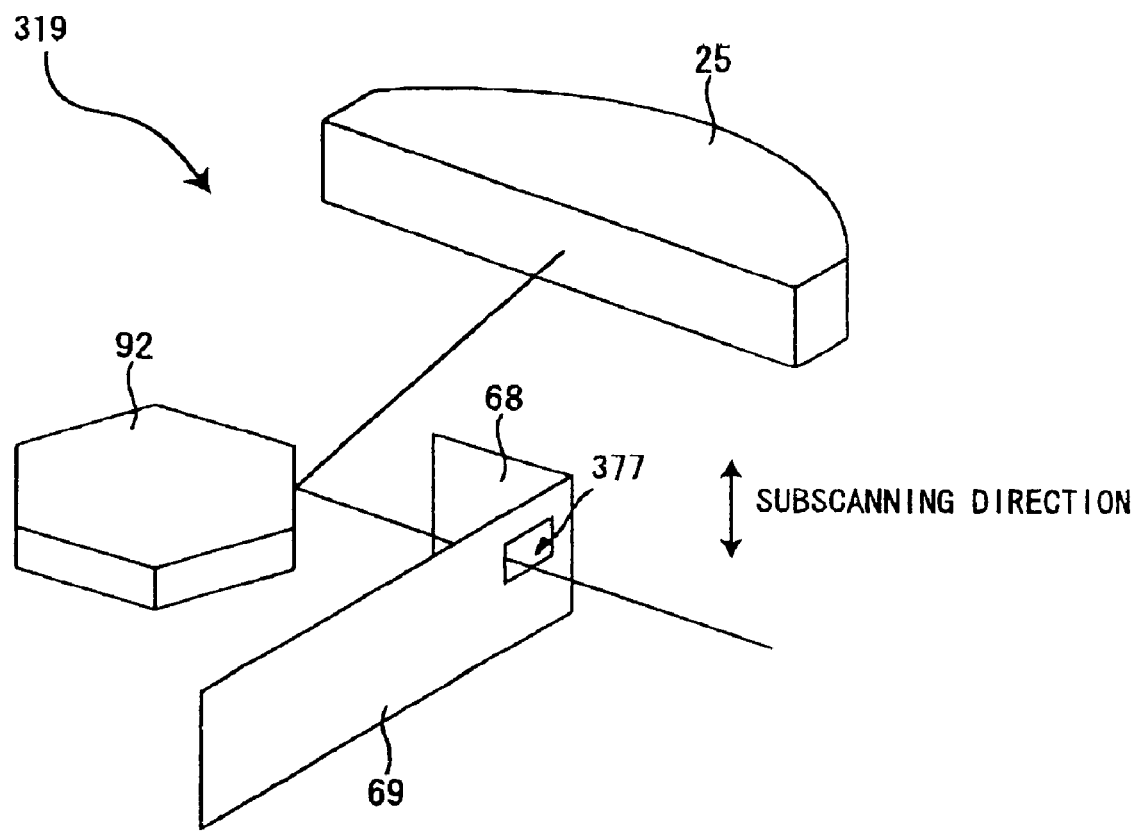
FIG. 9 is a perspective view schematically illustrating a scanning unit according to a fourth embodiment of the present invention.

Next, a scanning unit 319 according to a fourth embodiment of the present invention will be described FIG. 9 is a perspective view schematically illustrating the scanning unit 319, wherein like parts and components are designated with the same reference numerals to avoid duplicating description.

In the above-described embodiments, the input side opening 77 is formed by cutting out a narrow slit-shaped notch extending in the front-to-rear direction from the top edge of the front-to-rear rib 69. However, in the structure of FIG. 9, an input side opening 377 is formed as a rectangular throughhole that penetrates the front-to-rear rib 69. With this construction, the input side opening 77 can restrict the width of the laser beam in both the main and subscanning directions.

Since the scanning unit having this construction can prevent stray light, even when increasing the speed of the polygon mirror 92, stray light can be prevented from reaching the surface of the photosensitive drum 30. Hence, the scanning unit 19 of the preferred embodiment can form high quality electrostatic latent images on the photosensitive drum 30 to achieve high quality image formation.

While exemplary embodiments of this invention has been described in detail, those skilled in the art will recognize that there are many possible modifications and variations which may be made in these exemplary embodiments while yet retaining many of the novel features and advantages of the invention.

What is claimed is:

1. An optical scanner comprising:
a light source that emits a light;
a frame comprising a bottom plate and two side plates, the bottom plate including an elongated opening in which the direction of elongation is in a main scanning direction;
a deflecting unit, disposed on a main surface of the bottom plate, that deflects the light and scans the light in the main scanning direction; and
a scanning optical system that receives the light deflected by the deflecting unit and outputs the light below the bottom plate through the opening, the scanning optical system comprising a plurality of optical elements and a plurality of support members, the support members extending up from the main surface of the bottom plate and supporting the optical elements, wherein
the deflecting unit is disposed on a first side of the opening with respect to a lateral scanning direction orthogonal to the main scanning direction;
the support members are disposed on a second side of the opening opposite the first side with respect to the lateral scanning direction, and are not disposed on the first side;
the plurality of optical elements includes:
an fθ lens that converts the light deflected and scanned by the deflecting unit into a light scanned at a constant speed over a predetermined surface,
an optical face tangle error correction lens that corrects error in a scanning position of the light caused by optical face tangle error of the deflecting unit,
a first reflecting mirror that reflects the light that has passed through the fθ lens along an optical path toward the optical face tangle error correction lens, and
a second reflecting mirror that reflects the light that has passed through the optical face tangle error correction lens along an optical path toward the opening;
a first support member included in the plurality of support members supports both the optical face tangle error correction lens and the second reflecting mirror;
each end of the optical face tangle error correction lens in the main scanning direction is fixed to the first support member; and
the first support member supports the optical face tangle error correction lens such that light deflected by the deflecting unit travels through a gap formed between the optical face tangle error correction lens and the bottom plate prior to being reflected by first reflecting mirror.

2. An image-forming device comprising:
a photosensitive member having a photosensitive surface;
a light source that emits a light;
a frame comprising a bottom plate and two side plates, the bottom plate including an elongated opening in which the direction of elongation is in a main scanning direction;
a deflecting unit, disposed on a main surface of the bottom plate, that deflects the light and scans the light in the main scanning direction;
a scanning optical system that receives the light deflected by the deflecting unit and outputs the light below the bottom plate through the opening, the scanning optical system comprising a plurality of optical elements and a plurality of support members, the support members extending up from the main surface of the bottom plate and supporting the optical elements, wherein
the deflecting unit is disposed on a first side of the opening with respect to a lateral scanning direction orthogonal to the main scanning direction;
the support members are disposed on a second side of the opening opposite the first side with respect to the lateral scanning direction, and are not disposed on the first side
the plurality of optical elements includes:
an fθ lens that converts the light deflected and scanned by the deflecting unit into a light scanned at a constant speed over a predetermined surface,
an optical face tangle error correction lens that corrects error in a scanning position of the light caused by optical face tangle error of the deflecting unit,
a first reflecting mirror that reflects the light that has passed through the fθ lens along an optical path toward the optical face tangle error correction lens, and
a second reflecting mirror that reflects the light that has passed through the optical face tangle error correction lens along an optical path toward the opening;
a first support member included in the plurality of support members supports both the optical face tangle error correction lens and the second reflecting mirror;
each end of the optical face tangle error correction lens in the main scanning direction is fixed to the first support member; and
the first support member supports the optical face tangle error correction lens such that light deflected by the deflecting unit travels through a gap formed between the optical face tangle error correction lens and the bottom plate prior to being reflected by first reflecting mirror.

3. The image-forming device according to claim 2, wherein the light source is disposed on the second side of the opening.

4. The image-forming device according to claim 2, further comprising a base plate fixed to the frame, the base plate supporting the deflecting unit and having a width narrower than a width of the opening with respect to the main scanning direction.

5. The image-forming device according to claim 4, further comprising a plurality of base plate fixing members that fix the base plate to the frame, wherein the base plate fixing members are arranged such that a straight line through any two of the base plate fixing members intersects a line following the main scanning direction of the opening.

6. The image-forming device according to claim 5, further comprising:
a motor disposed on the base plate; and
a rotational shaft supporting the deflecting unit and being driven to rotate by a driving force from the motor, wherein
three of the base plate fixing members are arranged as vertices of a triangle such that the rotational shaft is positioned within an area in the triangle.

7. The image-forming device according to claim 2, further comprising a restraining spring having a base end fixed to the frame on the opposite side of the opening from the first support member and a free end extending over the opening to press the second reflecting mirror toward the first support member.

8. The image-forming device according to claim 2 further comprising an angle adjusting member that adjusts a mounted angle of the first reflecting mirror with respect to the bottom plate.

9. The image-forming device according to claim 2, further comprising a reinforcing rib provided along an edge of the opening in the main scanning direction, the reinforcing rib reinforcing the edge of the opening, wherein the reinforcing rib shields unnecessary light from at least one of the deflecting unit and the scanning optical system.

10. The image-forming device according to claim 2, further comprising a base member and three frame fixing members that fix the frame to the base member, wherein the three frame fixing members are arranged as vertices of a triangle such that the deflecting unit is positioned within an area in the triangle.

11. The image-forming device according to claim 2, wherein
each supporting member is disposed in the lateral scanning direction from a position of the opening.

* * * * *